United States Patent [19]

Yamada et al.

[11] Patent Number: 4,998,379
[45] Date of Patent: Mar. 12, 1991

[54] VEHICLE WINDOW REGULATOR

[75] Inventors: Takahiro Yamada; Kazuyoshi Kurahashi, both of Aichi; Shyuji Watanabe, Osaka, all of Japan

[73] Assignees: Asmo Co., Ltd., Kosai; Nippondenso Co., Ltd, Kariya; Daihatsu Motor Co., Ltd., Ikeda, all of Japan

[21] Appl. No.: 383,593

[22] Filed: Jul. 24, 1989

[30] Foreign Application Priority Data

Jul. 25, 1988 [JP] Japan ................. 63-184895

[51] Int. Cl.$^5$ ............................................. E05F 15/00
[52] U.S. Cl. ......................................... 49/138; 49/349; 49/351
[58] Field of Search .................... 49/138, 348–351, 49/360, 363, 502

[56] References Cited

U.S. PATENT DOCUMENTS 3,670,454 6/1972 Gebhard et al. .................. 49/349 X
4,777,766 10/1988 Johnson et al. .................. 49/351

FOREIGN PATENT DOCUMENTS 576171 5/1959 Canada .................................. 49/138
5634517 4/1981 Japan .................................. 49/350
194092 8/1988 Japan .
29592 1/1989 Japan .

Primary Examiner—Gary L. Smith
Assistant Examiner—Jerry Redman
Attorney, Agent, or Firm—Burns, Doane, Swecker & Mathis

[57] ABSTRACT

A vehicle window regulator displaces a window at a faster speed when the window is near its fully closed position than when the window is near its fully open position. The speed is controlled by the meshing of the peripheries of two gears, each periphery defining a varying radius about its axis of rotation. The gear peripheries can be of different shapes, such as circular eccentric, elliptical and logarithmically helical. One of the gears is driven by a constant speed electric motor.

7 Claims, 5 Drawing Sheets (a)

(b)

(a)

(b)

(a)

(b)

(a)

(b)

VEHICLE WINDOW REGULATOR

BACKGROUND OF THE DISCLOSURE

The present invention relates to a vehicle power window device for opening and closing of a vehicle window glass, and more particularly to an improved vehicle window regulator thereof.

A conventional general vehicle power window device is a device composed of an electric motor acting as a driving source, a vehicle window regulator for opening and closing a window glass by means of transmission of a torque of the electric motor, and a switching circuit for operating the electric motor so as to open and close automatically the window glass of a vehicle or the like.

Switches of the switching circuit are provided collectively in a driver's seat and in each passenger's seat so that each window glass can be opened to a given position.

Accordingly, a driver and passengers can open and close the each window glass to a given position from a driver's seat and passengers' seats by means of operation of the driver's seat switches and the passengers' side switches. As an example of such a vehicle power window device, FIG. 2 illustrates the state that the window glass rises and closes completely in case that the vehicle power window device is assembled in the right door facing a vehicle-running direction. The vehicle window regulator uses an electric motor 1 as a driving source and the electric motor 1 is decelerated by a uniform velocity gear train using a sector gear provided in a regulator base 3 fixed inside a door, swinging a regulator arm 5 to open and close the window glass 7. A spiral spring 19 is also provided in the regulator base 3 so as to balance the weight of the window glass 7. The window glass 7 is supported by a front runway 9 and a rear runway 11 so as to be able to rise and fall.

A movable rail 13 is fixedly attached to an lower part of the window glass 7.

A sliding pin 5p which slides in a slit 13a of the movable rail 13 is fixedly attached to an end of the regulator arm 5. A sub-arm 15 is swingably supported almost at a center of the regulator arm 5. The sub-arm 15 is provided in order that the window glass 7 is prevented from leaning and actuates smoothly. A fixed rail side arm 15a and a movable rail side arm 15b are incorporated by means of a caulking or the like. A sliding pin 15p which slides in a slit 17a of a fixed rail 17 is fixedly attached to an end of the fixed rail side arm 15a by means of a caulking or the like, and a sliding pin 15q which slides in a slit 13b of a movable rail 13 is fixedly attached to an end of the movable rail side arm 15b by means of a caulking or the like. In case of a conventional vehicle power window device, the uniform velocity gear provided in the regulator base 3 decelerates at a fixed rate. In case of a conventional vehicle power window device as constructed above, because the uniform velocity gear train provided in the regulator base decelerates at a fixed rate, the regulator arm also swings at a fixed angular velocity, thus opening and closing a window glass completely at an invariable velocity.

Accordingly, it is difficult to open the window glass only slightly from a complete-closed state and a switch operation must be repeated so as to close the window glass again when the window glass opens to excess. As a result thereof, a driver's attention is especially distracted by the above operation, which causes a possibility of negligent driving of the driver.

One method which is considered for the purpose of avoiding those difficulties is to control electrically not only the opening and the closing of the window glass, but also the velocity of opening and closing by means of a switching circuit. However, the method involves a gain in weight and an increase in cost.

SUMMARY OF THE INVENTION

It is an object of the present invention to provide a vehicle window regulator which has a simple structure so as to avoid a gain in weight and an increase in cost.

It is another object of the present invention to provide a vehicle window regulator which enables a window glass to open and close slowly from a complete-closed position.

It is a further object of the present invention to provide a vehicle window regulator which enables a window glass to open and close fast besides a complete-closed position side of the window glass. The vehicle window regulator which is provided by the present invention is characterized by being so constructed as to open and close the window glass slowly enough on a complete-closed position side by using a non-uniform velocity rate gear train to transmit an intermediate shaft driven by the electric motor to a driving shaft of a regulator arm which opens and closes the window glass.

In the vehicle window regulator of the present invention which is constructed as above, a non-uniform velocity rate gear train is used to transmit an intermediate shaft driven by an electric motor or a manual operation to a driving shaft of a regulator arm for opening and closing of a window glass, so that while the intermediate shaft is driven at a fixed angular velocity by the electric motor or the manual operation, an angular velocity of a swinging shaft of the regulator arm is so changed that the window glass opens and closes slowly enough on the complete-closed position side of the window glass. Further, the angular velocity of the swinging shaft of the regulator arm is so changed that the window glass opens and closes fast besides the complete-closed position side of the window glass, or a complete-open position side and a middle position.

Other and further objects, features and advantages of the invention will become appear more fully from the following description.

DETAILED DESCRIPTION OF THE PREFERRED EMBODIMENT

Figure 1A:
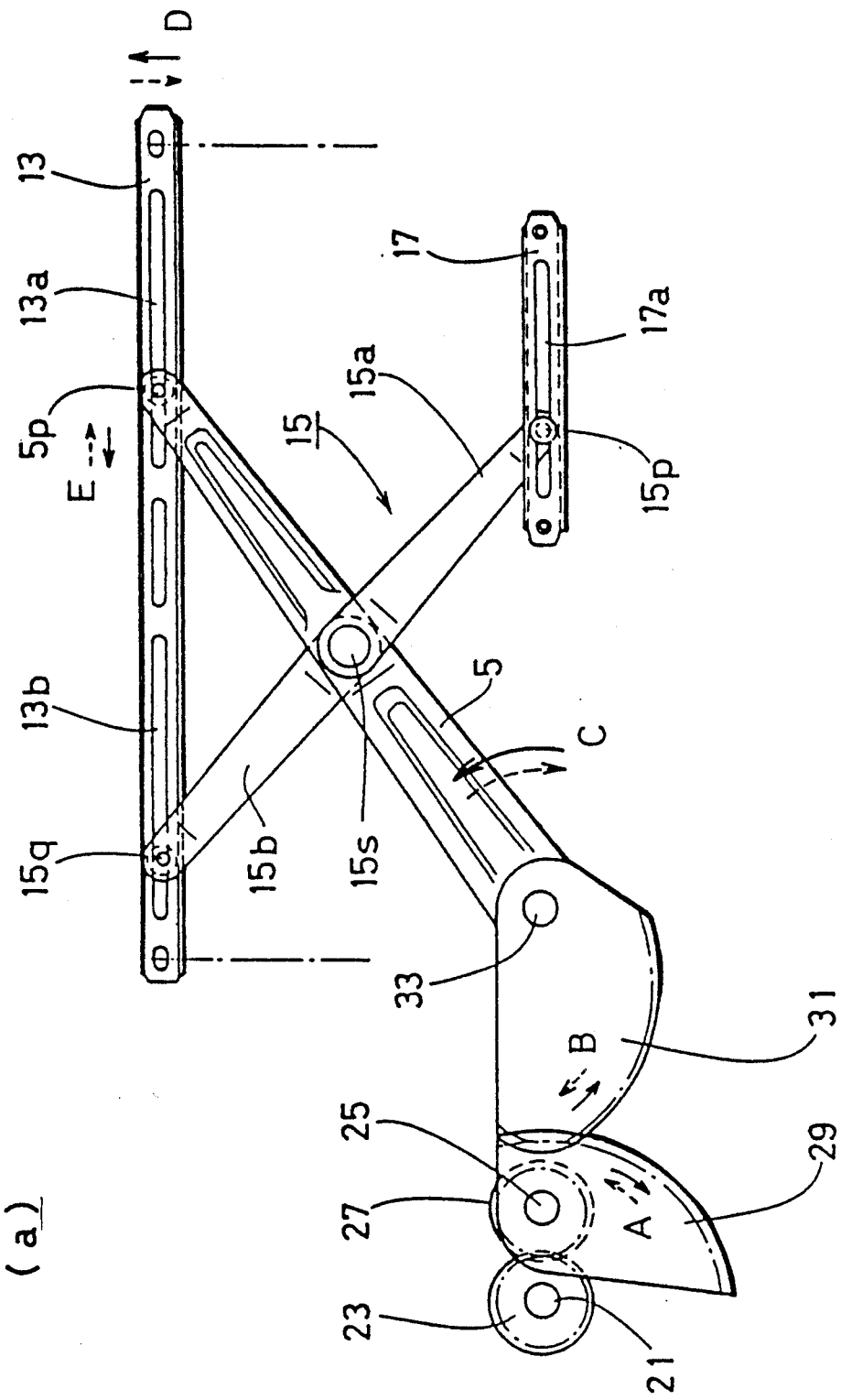
FIG. 1(a) is a front view illustrating a state that a window glass is about to close completely in a vehicle window regulator of an embodiment of the present invention.
Figure 1B:
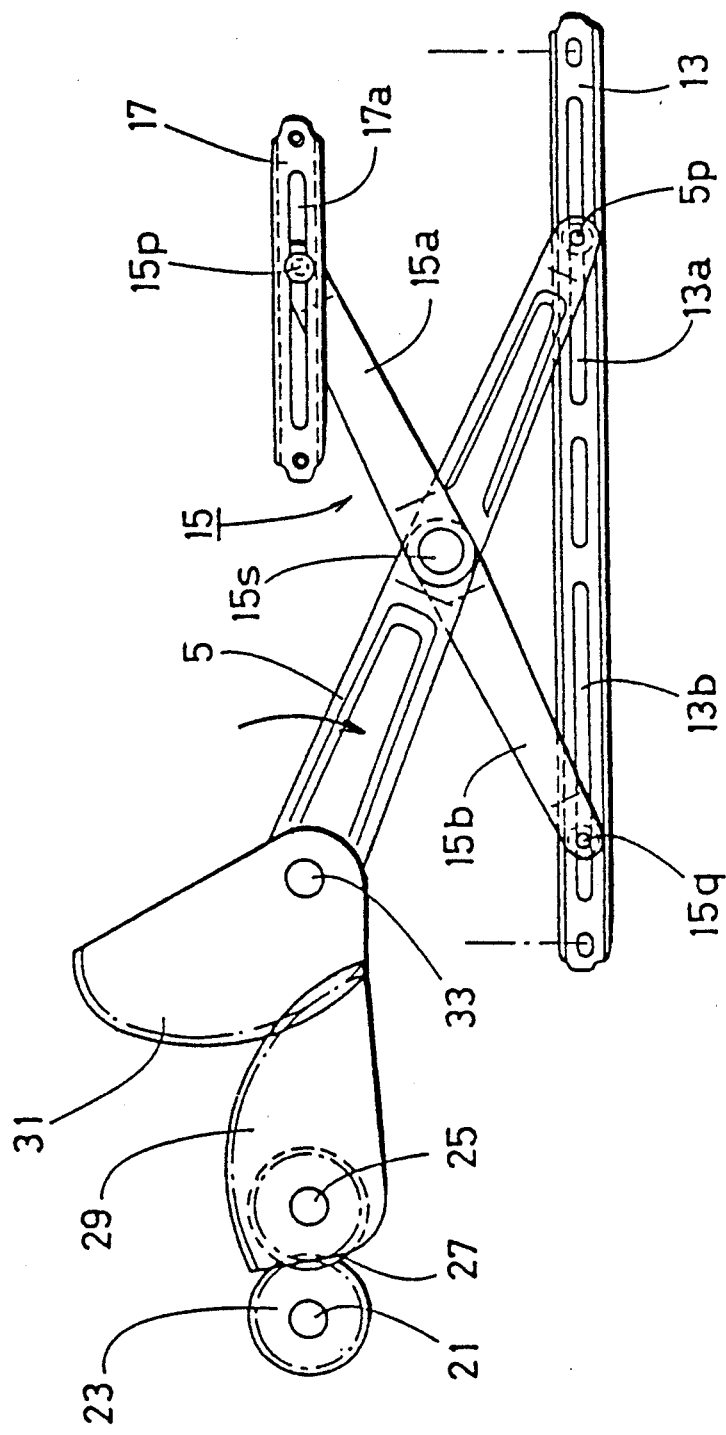
FIG. 1(b) is a front view illustrating a state that the window glass is about to open completely in said regulator.
Figure 3:
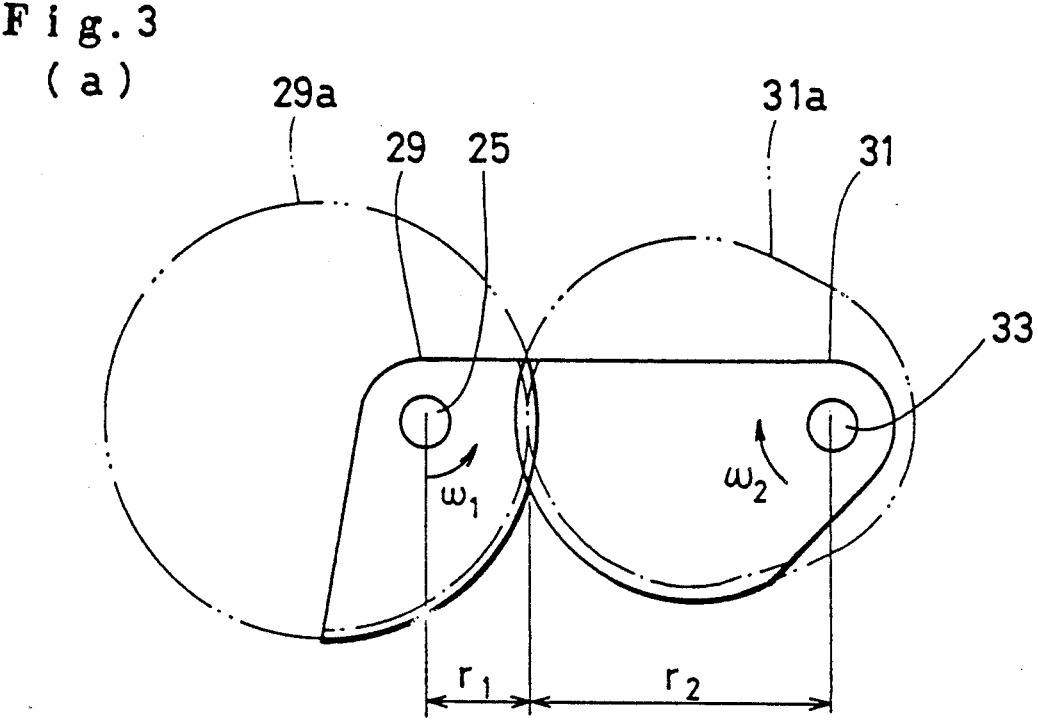
FIG. 3(a) is a schematic front view illustrating a combination of an eccentric circular gear and a non-circular gear in a non-uniform velocity rate gear train of the present embodiment.
FIG. 3(b) is a graph showing a relationship between a rotary angle $\theta_1$ through which the eccentric circular gear makes one rotation at a fixed angular velocity $\omega_1$ and an angular velocity $\omega_2$ of said non-circular gear which rotates while meshing with the eccentric circular gear.
Figure 3:
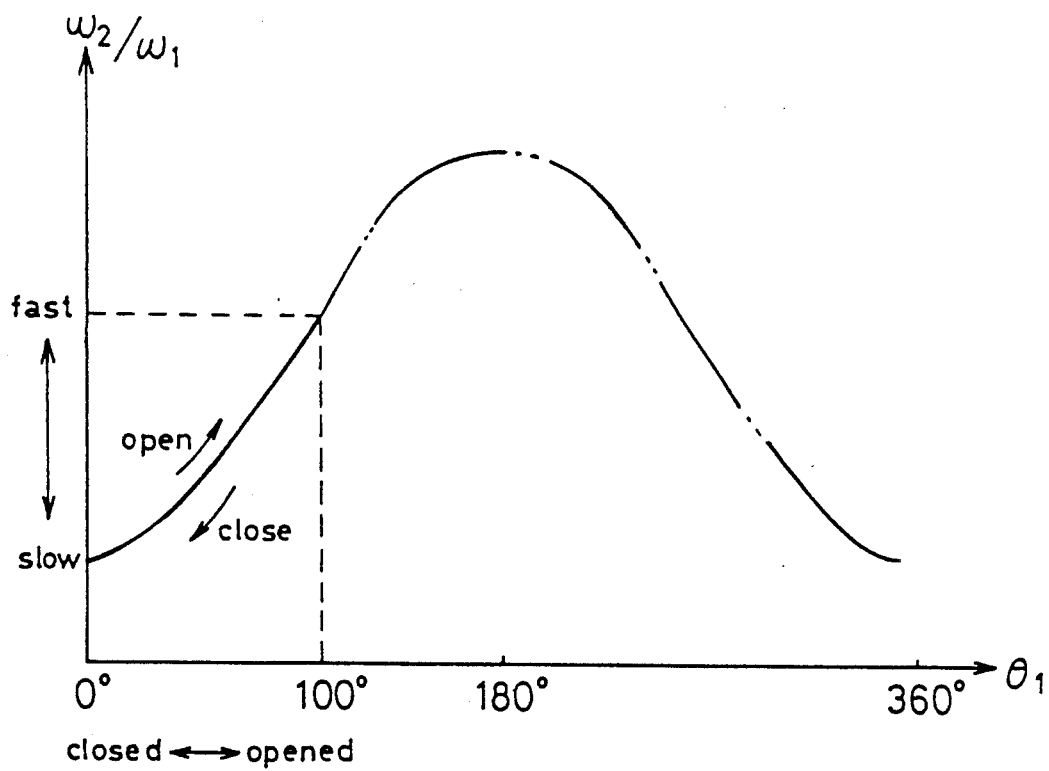
Figure 2:
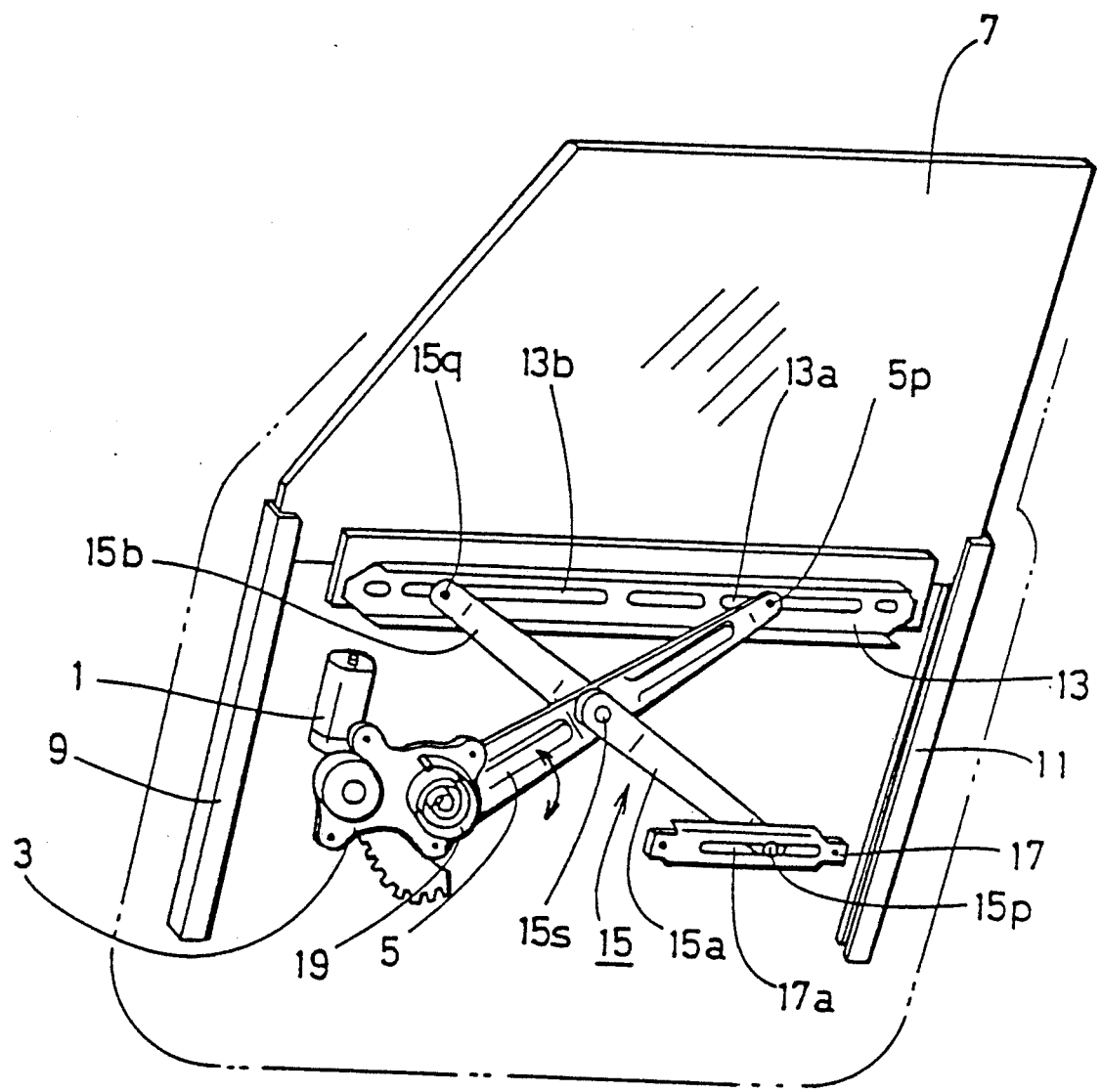
FIG. 2 is a perspective view illustrating a structure of a conventional general vehicle window regulator.

Referring now to FIGS. 1 to 3, there is shown therein an embodiment of the present invention.

The present embodiment is a partly modified embodiment of a conventional gear train provided in a regulator base of a vehicle window regulator of the type illustrated in FIG. 2.

In the present embodiment, each structure element and a position relation as illustrated in FIG. 2 are the same as conventional ones, therefore a structure of the present embodiment is explained referring to FIG. 1(a), FIG. 1(b) and FIG. 2.

The vehicle window regulator of the present embodiment uses an electric motor 1 as a driving source and the electric motor 1 is decelerated by a gear train 23, 27, 29 and 31 provided in a regulator base 3 fixed inside a door, swinging a regulator arm 5 around a driving shaft 33 to open and close the window glass 7. A spiral spring 19 is provided between the regulator base 3 and a driving shaft 33 so as to balance the weight of the window glass 7. The window glass 7 is supported by a front runway 9 and a rear runway 11 so as to be able to rise and fall.

A movable rail 13 is fixedly attached to an lower part of the window glass 7.

A sliding pin 5p which slides in a slit 13a of the movable rail 13 is fixedly attached to an end of the regulator arm 5. A sub-arm 15 is swingably supported almost at a center of the regulator arm 5. The sub-arm 15 is provided in order that the window glass 7 is prevented from leaning and actuates smoothly. A fixed rail side arm 15a and a movable rail side arm 15b are incorporated by means of a caulking or the like. A sliding pin 15p which slides in a slit 17a of a fixed rail 17 is fixedly attached to an end of the fixed rail side arm 15a by means of a caulking or the like, and a sliding pin 15q which slides in a slit 13b of a movable rail 13 is fixedly attached to an end of the movable rail side arm 15b by means of a caulking or the like. In respect to construction of the vehicle window regulator as illustrated in FIG. 2, FIG. 1(a) illustrates a state wherein the window glass is about to close completely and FIG. 1(b) illustrates a state wherein the window glass is about to open completely. A worm wheel meshing with a worm (not illustrated) fixedly attached to an electric motor 1 and a pinion 23 are fixedly attached to a worm wheel shaft 21 by means of a caulking or the like. An intermediate gear 27 meshing with the pinion 23 and an eccentric circular gear 29 are fixedly attached to an intermediate shaft 25 by means of the caulking or the like. A non-circular gear 31 meshing with the eccentric circular gear 29 is fixedly attached to the driving shaft 33 in the regulator arm 5 fixedly attached to the regulator arm shaft 15s by means of the caulking or the like.

The non-uniform velocity rate gear train using the non-circular gear is illustrated in FIG. 3(a).

FIG. 3(a) illustrates a meshing state of the eccentric circular gear 29 fixedly attached to the intermediate shaft 25 and the non-circular gear 31 fixedly attached to the driving shaft 33.

The eccentric circular gear 29 uses a portion of a spur gear 29a as an eccentric gear. The non-circular gear 31 meshing with the eccentric circular gear 29 uses a portion of a conjugated wheel 31a.

FIG. 3(b) illustrates the change in angular velocity $\omega_2$ at which the non-circular gear 31 rotates for a rotary angle $\theta_1$ through which the eccentric circular gear 29 makes one counterclockwise rotation at a fixed angular velocity, starting from the state as illustrated in FIG. 3(a).

The ratio of the angular velocity $\omega_1$ to $\omega_2$ is inversely proportional to $r_2/r_1$ the ratio of the distances or radii $r_1$ and $r_2$ from each rotary center to meshing position and $\omega_2 \alpha\ r_1/r_2$ is in proportion because of the fixed angular velocity $\omega_1$.

As illustrated in FIGS. 3(a) and 3(b), when the rotary angle $\theta_1$ of the eccentric circular gear 29 is 0°, the angular velocity $\omega_2$ of the non-circular gear 31 reaches its minimum and when the rotary angle $\theta_1$ is 180°, the angular velocity $\omega_2$ reaches its maximum.

In the present embodiment, the window glass closes completely when the rotary angle $\theta_1$ of the eccentric circular gear 29 is 0° and the window glass opens completely when the rotary angle $\theta_1$ of the eccentric circular gear 29 is about one hundred degrees.

The rotary angles of 0° to about 100° suffices the meshing of the both gears, therefore the eccentric circular gear 29 and the non-circular gear 31, which are illustrated in FIG. 3(a) by solid lines, are used in a practical structure.

While the angular velocity $\omega_1$ of the eccentric circular gear 29 is invariable both near the complete-closed position of window glass as illustrated in FIG. 1(a) and near the complete-open position of window glass as illustrated in FIG. 1(b) because the decelerated rate of the motor is constant, the non-circular gear 31 and the regulator arm 5 have a fairly different angular velocity $\omega_2$ from the angular velocity $\omega_1$, so that a movable rail 13 driven by the regulator arm 5 actuates so as to open and closes the window glass 7 slowly enough near the complete-closed side.

(ACTUATION OF THE EMBODIMENT)

According to the above construction, when a motor 1 rotates at a fixed velocity, a worm wheel shaft 21 also rotates at a fixed angular velocity. When the worm wheel shaft 21 rotates at a fixed velocity, a pinion 23 also rotates at a fixed velocity, thereby rotating an intermediate gear 27 which meshes with the pinion, an intermediate shaft 25 and an eccentric circular gear 29 at a fixed velocity. Just before a window glass 7 closes completely, the eccentric circular gear 29 rotates clockwise, as shown by an arrow A of a solid line in FIG. 1(a) and a non-circular gear 31 rotates counterclockwise on a driving shaft 33, as shown by an arrow B of a solid line. The angular velocity $\omega_2$ of the non-circular gear 31 becomes slow, because $\theta_1$ approaches 0°. When the non-circular gear 31 rotates counterclockwise on the driving shaft 33, a regulator arm 5 also rotates counterclockwise on the driving shaft 33, as shown by an arrow C of a solid line. A movable rail 13 and a window glass 7 are pushed up smoothly via a sliding pin 5p by the regulator arm 5, as shown by an arrow D of a solid line. The sliding pin 5p moves to left in FIG. 1(a) within a slit 13a of the movable rail 13, as shown by a solid-line arrow E. When the movable rail 13 rise, a sub-arm 15 rotates clockwise, moving a sliding pin 15q to right in FIG. 1(a) within a slit 13b and also a sliding pin 15p to left in FIG. 1(a) within a slit 17a of a fixed rail 17.

In order to open the window glass 7, a motor 1 is energized in a reverse direction. The eccentric circular gear 29, the non-circular gear 31, the regulator arm 5 and the movable rail 13 move in a direction contrary to the direction described above, as shown by dotted-line arrows A, B, C and D. When the window glass opens from a complete-closed position, an angular velocity $\omega_2$ of the non-circular gear 31 is so slow similiarly when $\theta_1$ approaches 0°, that the window glass 7 falls slowly at first. Thus, the present invention enables the window glass 7 to open slightly from the complete-closed position.

When the motor 1 continues to be energized in the reverse direction, the regulator arm 5 rotates clockwise, continuing to fall the movable rail 13, the movable rail 13 thus pass a position of the fixed rail 17 in a direction shown by the arrow D as illustrated in FIG. 1(a). As illustrated in FIG. 1(b), when the movable rail 13 reaches a lower end position, the window glass 7 opens completely. As illustrated in FIG. 3(b), the rotary angle $\theta_1$ of the eccentric circular gear 29 widen gradually for 100° or an open side, and the angular velocity $\omega_2$ of the non-circular gear 31 also widens, so that the window glass 7 opens and closes fast.

Because the vehicle window regulator of the present embodiment substitutes the non-uniform velocity rate gear train for a part of the conventional uniform velocity gear train without the need of a circuit for controlling an opening and closing velocity of the window glass, the number of a part is the same as the conventional one, so that a cost for the part and the assembly can be prevented from increasing. Moreover, the vehicle window regulator can be rotated not only by a motor, but also by a manual operation.

(OTHER EMBODIMENT)

The present invention is not intended to be limited to details of the above embodiment, therefore an elliptic gear may or a logarithmic helical gear may be used as a non-circular gear employed to transmit an intermediate shaft driven by an electric motor or a manual operation to a driving shaft of a regulator arm for opening and closing a window glass.

Figure 4:
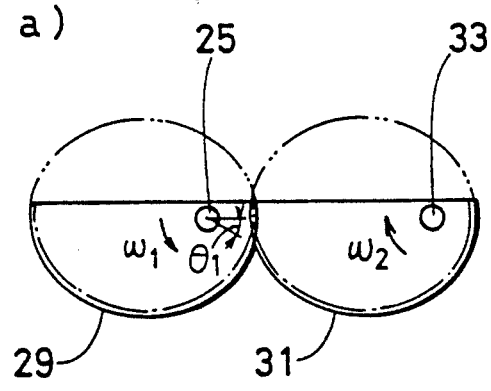
FIG. 4(a) is a schematic front view illustrating a non-uniform velocity rate gear train of a second embodiment.
FIG. 4(b) is a graph showing a relationship between a rotary angle of an intermediate shaft and an angular velocity of a driving shaft in the second embodiment.
Figure 4:
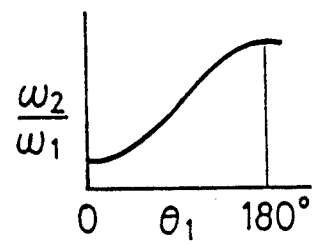

In a second embodiment as illustrated in FIG. 4(a), a non-uniform velocity rate gear train is composed of two elliptic gears 34 and 35 provided shafts 25 and 33 in each focal position. In the elliptic gears 34 and 35, unnecessary parts for meshing are eliminated. As shown in a velocity rate curve of the elliptic gears 36 and 35 as illustrated in FIG. 4(b), in the same manner as a first embodiment, a velocity rate $\omega_2/\omega_1$ reaches its maximum when a rotary angle $\theta_1$ of the elliptic gear 34 is 180°. According to the second embodiment, gears with common shapes can be used and the elliptic gears are comparatively easy to manufacture.

Figure 5:
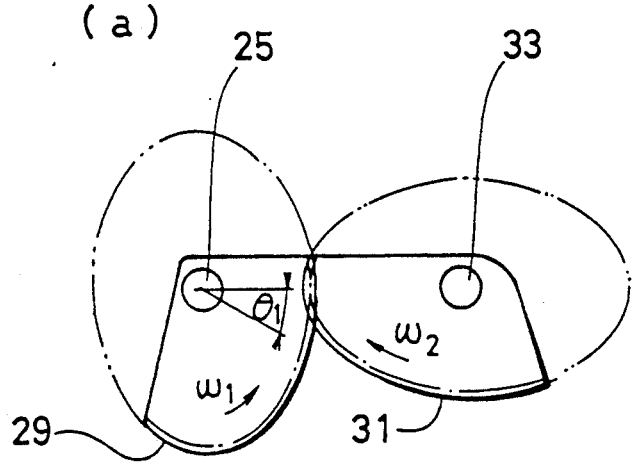
FIG. 5(a) is a schematic front view illustrating the non-uniform velocity rate gear train of a third embodiment.
FIG. 5(b) is a graph showing a relationship between the rotary angle of the intermediate shaft and the angular velocity of the driving shaft in the third embodiment.
Figure 5:
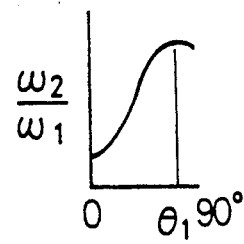

In the third embodiment as illustrated in FIG. 5(a), the non-uniform velocity rate gear train is composed of the two elliptic gears 36 and 37 which provide an intermediate shaft 25 and a driving shaft 33 on a geometrical center. In the elliptic gears 36 and 37, unnecessary parts for meshing are eliminated. As shown in a velocity rate curve of the elliptic gears 36 and 37 as illustrated in FIG. 5(b), the velocity rate $\omega_2/\omega_1$ reaches its maximum when the rotary angle $\theta_1$ of the elliptic gear 35 is 90°.

Figure 6:
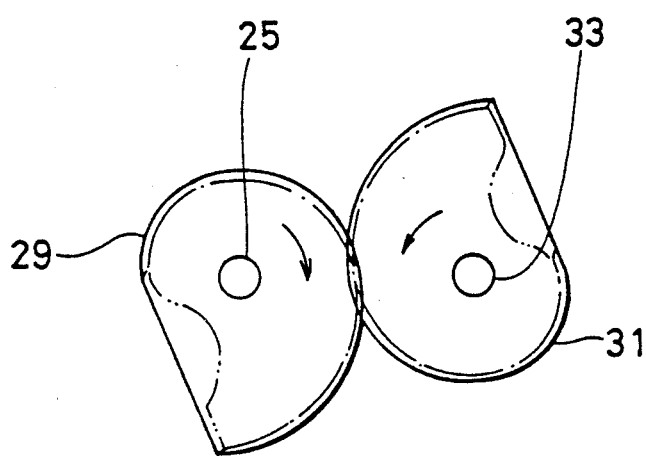
FIG. 6(a) is a schematic front view illustrating the non-uniform velocity rate gear train of a fourth embodiment.
FIG. 6(b) is a graph showing a relationship between the rotary angle of the driving shaft and the angular velocity of the driving shaft.
Figure 6:
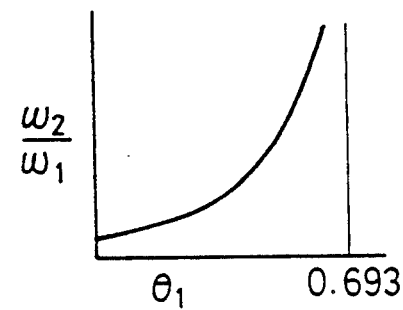

In a fourth embodiment as illustrated in FIG. 6(a), the non-uniform velocity rate gear train is composed of two logarithmic helical gears 38 and 39 which provide the intermediate shaft 25 and the driving shaft 33 on a logarithmic helical center. In the logarithmic helical gears 29 and 31, unnecessary parts for meshing (two-point chain line parts) are connected by a straight line like a solid line. In the fourth embodiment, gears with common shapes can be used and there are combinations for several functional relations.

Although the invention has been described in its preferred form with a certain degree of particularlity, it is understood that the present disclosure of the preferred form has been changed in the details of construction and the combination and arrangement of parts may be resored to without departing from the spirit and the scope of the invention as hereinafter claimed.

What is claimed is:

1. A vehicle window regulator for opening and closing a vehicle window in response to a rotary input, comprising:
    a first gear driven by the rotary input for rotation about a first axis, said first gear having a first curved periphery defining a varying radius with respect to said first axis, and
    a second gear operably connected to the window and rotatable about a second axis, said second gear having a second curved periphery defining a varying radius with respect to said second axis, said second periphery meshing with said first periphery so that rotation of said first gear is transmitted to said second gear for displacing the window between fully open and fully closed positions,
    a first radius extending between said first axis and a meshing location of said first and second gears, said first radius forming a ratio with a second radius extending between said second axis and said meshing location, said ratio changing as said window travels such that said ratio is smallest when the window is at a fully closed end of its displacement and said ratio is largest when the window is at a fully open end of its displacement, whereby a travel velocity of the window is slower adjacent said fully closed end of window replacement and faster adjacent said fully open end of window replacement.

2. A vehicle window regulator according to claim 1, wherein said first periphery is of circular shape, the geometric center of which is spaced from said first axis.

3. A vehicle window regulator according to claim 2, wherein said second periphery is of elliptical shape.

4. A vehicle window regulator according to claim 1, wherein said first and second curved peripheries are of elliptical shapes the focal positions of which are defined by said first and second axes, respectively.

5. A vehicle window regulator according to claim 1, wherein said first and second curved peripheries are of elliptical shapes the geometrical centers of which are defined by said first and second axes, respectively.

6. A vehicle window regulator according to claim 1, wherein said first and second peripheries are of logarithmic helical shapes the logarithmic helical centers of which are defined by said first and second axes, respectively.

7. A vehicle window regulator according to claim 1 including an electric motor operably connected to said first gear for rotating said first gear at a substantially uniform velocity.

* * * * *